United States Patent [19]

Shutt

[11] 4,071,380

[45] Jan. 31, 1978

[54] METHOD FOR TREATING OXIDIZED STEEL SURFACES

[76] Inventor: George T. Shutt, 1421 Norman Place, St. Louis, Mo. 63122

[21] Appl. No.: 719,737

[22] Filed: Sept. 2, 1976

Related U.S. Application Data

[63] Continuation of Ser. No. 601,379, Aug. 4, 1975, abandoned.

[51] Int. Cl.$^2$ .............. C23F 7/00; C23F 7/08
[52] U.S. Cl. .......... 148/6.15 R; 148/6.14 R; 148/6.16; 148/6.2; 427/372 B; 427/403; 106/287 S; 428/450
[58] Field of Search ........... 148/6.14 R, 6.35, 6.15 R, 148/6.15 Z, 6.16, 6.2; 428/450; 427/344, 372 B, 403; 106/287 S

[56] References Cited

U.S. PATENT DOCUMENTS

| | | | |
|---|---|---|---|
| 3,056,684 | 10/1962 | Lopata et al. | 106/14 |
| 3,232,771 | 2/1966 | Pearce | 106/38.35 |
| 3,258,346 | 6/1966 | Fisher, Jr. | 106/14 |
| 3,392,036 | 7/1968 | McLeod | 106/1 |
| 3,432,312 | 3/1969 | Feagin et al. | 106/38.3 |
| 3,660,119 | 5/1972 | Oken | 106/1 |
| 3,778,280 | 12/1973 | Dettrich et al. | 106/1 |

FOREIGN PATENT DOCUMENTS

2,341,536   7/1974   Germany.

*Primary Examiner*—Ralph S. Kendall
*Attorney, Agent, or Firm*—Ralph W. Kalish

[57] ABSTRACT

A method of treating a corrosible steel substrate having a coating of oxidized steel thereon, which comprehends applying to the oxidized steel coating a solution of an alkyl silicate in quantity sufficient to saturate the oxidized steel coating, permitting the solution to cure by hydrolysis, and thereupon to apply a topcoating. The solution may be partially prehydrolyzed as within the range of 40-98% and may contain dry particulate matter which is water insoluble and having a coloration sufficient for visual detection so as to readily indicate the state of saturation of the oxidized steel coating. Furthermore, the solution may additionally contain water soluble corrosion inhibiting compounds for producing ions which will react with the anodic steel substrate.

10 Claims, No Drawings

METHOD FOR TREATING OXIDIZED STEEL SURFACES

This is a continuation of application Ser. No. 601,379 filed Aug. 4, 1975, now abandoned.

BACKGROUND AND SUMMARY OF THE INVENTION

This invention relates in general to corrosion inhibition of steel, and more particularly, to a method of treating oxidized or rusty surfaces of carbon and low alloy steels for reliable acceptance thereon of a paint or protective coating. Heretofore, iron, steel, and low alloy steels, hereinafter referred to as steel, contrary to stainless steels, aluminum, magnesium, zinc, copper, nickel, chromium, lead, silver, gold, etc., exhibit a high degree of corrosibility in atmospheric environments, and they require expensive and timeconsuming surface preparation procedures for reliable acceptance of corrosion protective coatings and paints thereon, e.g. sandblasting, wire brushing, grinding, acid cleaning, etc. to remove the oxidized products of corrosion. It is well known that oxidized steel or rust has relatively little tensile strength to the unoxidized steel substrate so when a conventional paint primer containing an organic binder or vehicle is applied, the primer on curing customarily shrinks 50 percent or more in all directions thereby stressing the adhesion of the oxidized metal to the substrate and thus conducing to early disbondment of the primer together with any subsequently applied topcoats. The relatively high tensile strength of the organic film, or as otherwise stated, its contractibility upon curing, presents a force disruptive of the adherence of the oxidized steel to the substrate. Another problem unsatisfactorily solved to the present time is caused by the fact that the primers heretofore used are slow drying which results from the organic character of the constituent vehicle. Among such vehicles are alkyd resins, oleo resins, linseed oil, fish oils, and vegetable oils, all of which cure or harden through relatively slow oxidizing reactions. Such primers, whether they be used upon oxidized or unoxidized metal surfaces have exhibited a lack of adequate porosity to permit the migration of soluble corrosion inhibiting ions, such as chromates, phosphates, molybdates, and the like to the metal substrate through the primer film, comprehending a migration through the natural pores of the oxidized steel to the unoxidized steel where such ions can react to inhibit further corrosion. Furthermore, when oxidized steel is primed with an organic primer, the resulting film dimensionally shrinks on curing within the interstices of the oxidized steel film thereby opening up microscopic stress cracks which conduce osmotic migration of water under the primer and the paint coatings resulting in blistering and disbondment of the topcoat.

It has been customary to the present time to use phosphates as corrosion inhibiting compounds in so-called "wash primers" in pretreatment of steel before priming. However, in such cases the oxidizing reaction with the metal substrate is prior to the application of the topcoat and since such compounds are acid in nature, the application of the same is hazardous to personnel and thereby require closely controlled conditions for application.

Therefore, it is an object of the present invention to provide a method for treating oxidized steel surfaces wherein a solution is utilized which upon curing is inorganic and does not contract upon hardening so as to stress the adhesion of the steel oxides to the substrate and thereby conduce to ultimate disbondment.

Another object of the present invention is to provide a method of the character stated wherein the cured solution dimensionally fills the pores of the oxidized steel film and thereby improving and enhancing the shear strength, compressive strength, and curing strength of the resultant film.

It is another object of the present invention to provide a method of the character stated wherein the solution utilized contains a liquid vehicle or liquid binder system exhibiting comparable rust penetrating qualities as do organic primers, but which cure and harden by solvent evaporation and hydrolyzing reactions with environmental moisture; and thus with the present invention moist environments are conducive to fast curing time and fast recoat time.

It is a further object of the present invention to provide a method of the character stated which comprises treating an oxidized metal surface with a solution having an organic vehicle which, on curing becomes inorganic, and develops shrinkage cracks, pores, and small interstices within the resultant film, which latter are continuous in nature and provide paths for travel of soluble corrosion inhibiting ions, through the oxidized steel to the unoxidized steel substrate, thereby controlling further undesired oxidation.

It is a still further object of the present invention to provide a method of the character stated whereby osmotic water blistering of the topcoat is inhibited.

It is a still further object of the present invention to provide a method of the character stated wherein the applied solution may contain neutral metal phosphate salts which are nonhazardous to the applying personnel and which react in an oxidizing manner with the anodic metal substrate, causing formation of insoluble metal phosphates deposited in the cracks, pores, interstices of the cured film to prevent corrosion undercutting of applied topcoats.

It is another object of the present invention to provide a method of the character stated which eliminates sandblasting of oxidized steel surfaces prior to application of the solution which eliminates "lost" sandblasting efforts due to unexpected rainfall; which accelerates job completion through more efficient use of labor; which permits treatment (may also be called priming) at low temperatures and under moist conditions; which permits of application of the solution over damp surfaces; and which permits first topcoat applications within approximately five minutes subsequent to the application of the solution thereby reducing rigging time for moving paint stations, scaffolding, and like support structures; and which permits waterblasting and the elimination of objectionable generation of dust.

GENERAL STATEMENT OF THE INVENTION

The present invention comprehends a method of treating oxidized steel surfaces by applying thereto a solution constituted of an alkyl silicate only in order to utilize the physical and chemical characteristics and properties of such compound for maintaining the oxidized steel film as an integral component of the film resulting from curing of the solution. By the present invention, the porous character of a fully cured or hydrolyzed alkyl silicate is availed of to provide passage for oxygen and water for effecting a corrosion inhibiting oxidizing action with the underlying steel substrate; with the resultant oxidized steel being retained within the pores of the inorganic cured solution as an integral part of the film.

The present invention also contemplates the application to oxidized steel surfaces of a solution containing an alkyl silicate as a vehicle or binder and a mixture of dry, inert particulate matter which facilitates application of the solution by its particulate color and aids the appearance of the subsequently applied topcoats by smoothing the surface. The chemistry of alkyl silicate solutions is well known to paint chemists to the extent that the same are utilized as vehicles or binders in inorganic zinc-rich primers, wherein zinc dust pigments are used in sufficiently high concentration to obtain electrical conductivity. However, such zinc rich primers must be applied over unoxidized steel or "white metal" to perform as an effective primer since the zinc dust serves primarily for galvanizing the clean, unoxidized steel substrate, and to do so requires contact between zinc dust metal and and unoxidized steel. The present invention teaches the treatment of oxidized steel surfaces and does not involve zinc-rich primers, nor relate to the provision of agents for effecting galvanization or sacrificial metal for protecting the substrate wherein the substrate would be cathodic as distinguished from anodic as required by the present invention. The present invention also contemplates applying a solution to an oxidized steel surface which solution may contain water soluble phosphate salts or such phosphate salts with particulate matter for coloring purposes.

DESCRIPTION OF THE PRESENT INVENTION

The method of the present invention is adapted for treating, as by priming, oxidized steel substrates as customarily encountered in the form of underground pipes; underwater structures; above-ground structures, and the like. Fundamentally, the present method resides in applying a partially prehydrolyzed alkyl silicate to an oxidized steel substrate, and to permit said alkyl silicate to cure or harden by becoming 100 percent hydrolyzed. The prehydrolysis would desirably be within the range of 40-98% and the solution may be applied to the substrate in any convenient manner, such as by troweling, brushing, spraying, dipping, or the like. The said solution is applied in sufficient quantity to saturate the existent oxidized film, with the state of saturation being readily determined visually. The hydrolysis may be completed as from ambient moisture with the more humid environment obviously promoting more rapid curing. Upon curing the alkyl silicate provides an inorganic film which causes the oxidized steel film to be stably maintained upon the substrate and to become an integral part of a rigid barrier protective of the substrate. The lack of an effective tensile strength in the cured film prevents a stressing of the adhesion of the oxidized steel to the steel substrate so that the oxidized steel is not subjected to forces tending to remove or disbond same from the substrate. As is well understood, oxidized surfaces, as of rust and the like, are of generally porous nature so that the alkyl silicate film will dimensionally fill the pores of the oxidized film and thereby enhance the shear, and compressive strength thereof. It is also known that a fully cured or hydrolyzed alkyl silicate contains pores. These pores provide passageways for movement therethrough of inhibiting ions for reaction with the steel substrate. Such pores or passageways develop from shrinking or other stresses caused by the hydrolysis, however, overall shrinkage is substantially less than the customary shrinkage encountered in the use of organic binders in metal primers. Furthermore, such organic binders on curing demonstrate relatively high tensile strength which tends to loosen the oxidized steel from the substrate and thus prevent requisite adhesion of the primer. Exemplary of the differential in overall shrinking is the fact that a conventional organic primer will shrink on curing from a wet film thickness of 10/1000 inch to a dry film thickness of 3/1000 inch, whereas by comparison, an alkyl silicate solution will shrink from a wet film thickness of 10/1000 inch to a dry film thickness of about 7/1000 inch. The shrinkage occurs internally in the latter solutions as manifested by stress cracks and shrinkage cracks, whereas in the ordinary organic binder no such cracks occur, and therefore, the latter while seemingly impervious to moisture and ion migration, conduce to osmotic migration of water and disbondment of the coating system such is contrary to the properties exhibited by the cured inorganic films of the present invention.

Therefore, with the present invention, a solution of 40-98% prehydrolyzed alkyl silicate is applied to an existing metal oxidized surface and applied in such quantity as to effect saturation. As known to those experienced in the art, viscosity and "dry to touch" times may be controlled through the addition of appropriate solvents such as alcohol, cellosolve, methyl ethyl ketone, toluol, Xylol, and the like. The same is then allowed to dry, that is, to cure or harden which would be evident by the film being dry to the touch and thereupon a customary protective topcoat could be applied.

Among the alkyl silicates useful for practicing the present invention are methyl silicate, ethyl silicate, propyl silicate, isopropyl silicate, butyl silicate, hexyl silicate, 2-ethyl hexyl silicate, tetra ortho methyl silicate and tetra ortho ethyl silicate. The alkyl silicates are of the character wherein each of the alkyl groups contain 1 to 8 carbon atoms but with the most common of these being the ethyl silicates, but all such silicates within this categorization may be employed either alone or in admixture.

Although the present method may be practiced by utilization of the alkyl silicate solution alone, it has been found that the intermixing of dry particulate, inert matter with the prehydrolyzed alkyl silicate brings about certain additional desired results. Thus, such matter may have sufficient pigmentation so as to conduce to a more facile visual determination of the point of saturation as saturation will be evident when such matter constitutes a relatively solid surface coloration thereby signaling that the requisite quantity has been applied. Additionally, the usual oxidized metal surface is rough in texture so that such dry particulate matter serves as a filler to smooth such roughness. Such matter would be preferably within a mesh size of about, desirably, −325 as the finer the particle size, the more adherent the developed coating. Although there is no intention to limit the mesh size it has been found that finely divided matter, as of dust-like character, is preferable. Furthermore, such matter may be a single composition or an admixture of a plurality of such compositions.

The compositions of matter or compounds within this group are thus inert to the extent that the same are not active with respect to corrosion control, but serve to promote the hardness and firmness of the porous layer developed by the cured alkyl silicate and conducing to the adherence of the same upon the substrate upon curing. Since water insoluble paint pigments are well known in the art, there is no intention to limit same herein, but, for purposes of illustration only, the following are exemplary of dry particulate matter of this type: silica, talc, mica, kaolin, bentonite, asbestos, fireclay, aluminum oxide, zircon, ferric oxide, tin oxide, titanium oxide, chromium oxide, carbon, copper oxide, and metal pigments such as copper, aluminum, stainless steel, etc., as well as zinc in quantities less than required to cause galvanic reaction with the steel substrate.

The amount of dry particulate matter premixed with the alkyl silicate solution may vary with the thickness of the oxidized steel layer to be penetrated by the said solution. Upon application the dry particulate matter will remain substantially on the surface of the oxidized steel layer, while the silicate solution separates therefrom and penetrates the said layer. To determine the amount of dry particulate matter for coloring and filling purposes, as above described, it has been found that 1 part of such matter to as much as 100 parts of the alkyl silicate solution, by volume, with the latter being prehydrolyzed within the range of 40-98% would be effective for an oxidized steel layer thicker than 3/1000 inch, whereas 1 part particulate matter to as much as 25 parts of alkyl silicate solution, by volume, in the aforesaid prehydrolyzed range, is useful for oxidized metallic layers having thicknesses between 1/1000 inch and 3/1000 inch. With oxidized layers of less than 1/1000 inch, the volume mixture may be as much as 1 part particulate matter to 1 part of the said alkyl silicate solution. The ratios above set forth assure of sufficient liquid solution to penetrate the oxidized metal layer without depriving the coating provided by the particulate matter of adequate solution, which deprivation could result in a chalking or dust-like texture of the mixture upon curing.

The method of the present invention also comprehends the addition to the solution of certain corrosion-inhibiting compounds capable of producing ions for reacting with the metal substrate. To effect appropriate protection, such ions must be available under oxidizing conditions at the steel substrate and by reason of the cathodic metal oxide, such as rust, on the steel substrate, the appropriate oxidative environment is provided. Oxidized steel adhering and bonded to unoxidized steel is cathodic to the unoxidized steel and for illustration only, in the case of iron oxides to iron, the driving potential is of the order of a 0.2 to 0.3 volts when in the presence of an electrolyte. Such electrolytic cells existing between steel oxides and the unoxidized steel will exhibit reductive reactions at the cathodic sites and oxidative reactions on the anodic unoxidized steel. This phenomena which is typical of corrosion cells is understood by those skilled in the art. Accordingly, by introduction of ionizable corrosion controlling compounds to the solution, the inherent porosity of the fully hydrolyzed, cured, inorganic coating will conduce to the migration of corrosion inhibiting ions to the anodic substrate in the presence of water, and thus, facilitate the formation of corrosion controlling salts at the anodic sites and on the metal substrate. With conventional organic priming solutions, such inhibiting compounds must necessarily be of the magnitude of 40-50% by weight of the priming solution since the cured organic coating is impervious, being non-porous and, hence, does not conduce to the migration of such ions. With the present method, requisite ion producing compounds may be no more than in a range of 0.01 to 15 percent by weight of the solution mixture. Corrosion controlling compounds useful for this purpose are from the class consisting of inorganic water soluble phosphates, such as sodium phosphate, calcium phosphate, potassium phosphate, ammonium phosphate, and magnesium phosphate. The characteristics of the selected alkyl silicate may have some determining consideration relative to the phosphate selected, as for instance, a certain commercial silicate may exhibit more tolerance to alkalinity and thereby permit use of dibasic ammonium phosphate and dibasic sodium phosphate when otherwise monobasic phosphates would be used.

It is recognized that the state of the art reveals the utilization of trisodium phosphate for the purpose of controlling the curing rate or hydrolyzing rate of the liquid binder of a particular primer which also contains dry particulate matter of essentially 80 percent zinc. With the present method trisodium phosphate is too alkaline for use in the applied solution (or primer) and as pointed out above, any inclusion of zinc would be in a concentration too small to have any galvanic effect on the steel substrate.

Merely exemplary of the structures amenable to treatment by the present method are the following:

Fresh water and salt water barges (above and below water);

Decks, fittings, machinery;

Off-shore structures, cabins, bulkheads, masts, etc. on ships, steel stacks, boiler breaching, bridges, tank farms, boot tops on ocean freighters, steel piling in brackish water, chemical equipment, structural steel, food plant floors, walls, ceiling, galvanized structures, railroad cars, etc.

From the foregoing the present method should be quite apparent and the practice of the same involving a solution consisting only of 40-98% prehydrolyzed alkyl silicate solution has been set forth. As an example of the performance of the method for treating an oxidized steel surface wherein the solution contains dry particulate matter for coloring purposes, 1 part by weight of iron oxide may be mixed with as much as 100 parts by weight of prehydrolyzed alkyl silicate solution; the solution mixture is then applied to the oxidized steel causing the color thereof to be hidden by the iron oxide. Thereupon the applied solution is allowed to dry to the touch and then hydrolyzes by environmental moisture which continues until curing is complete. A protective topcoating may be applied after the solution is "dry to touch".

When utilizing the method for enhanced corrosion control there may be added a water soluble phosphate as above described. For illustration only, 1 part by weight of powdered anhydrous disodium phosphate is mixed with 3 to 10,000 parts by weight of 40-98% prehydrolyzed alkyl silicate solution. The mixture is then applied to the metal oxidized layer to saturate the same with the silicate. If desired, a topcoating may be applied. In this aspect of the method, the existing oxidized steel serves as particulate matter and such method is recommended to protect the metal substrate from further corrosion, being particularly useful in a relatively corrosive environment where the topcoat application may be delayed.

In situations wherein the metal oxide is relatively light, that is, wherein the layer of the same is of limited thickness, the solution for practicing the present method may contain dry particulate matter together with the water soluble phosphate.

Having described my invention, what I claim and desire to obtain by Letters Patent is:

1. A method for treating a corrosible steel substrate having a rusted oxidized layer thereon comprising applying to said oxidized layer a solution of a partially cured alkyl silicate wherein the alkyl group of said alkyl silicates contains 1 to 8 carbon atoms and zinc, if present, in quantities less than required to cause electrolytic action with the metal substrate, said solution being in such quantity as to saturate the oxidized layer, permitting the applied solution to cure for developing a film stably maintaining the rusted oxidized layer upon said substrate, and then applying a top coating upon said cured silicate film.

2. A method of treating a corrosible steel substrate having a rusted oxidized layer thereon as defined in claim 1 and further characterized by said solution of the alkyl silicate being hydrolyzed within the range of 40 to 98%.

3. A method of treating a corrosible steel substrate having a rusted oxidized layer thereon as defined in claim 2 and further characterized by applying said solution of an alkyl silicate under ambient conditions.

4. A method of treating a corrosible steel substrate having a rusted oxidized layer thereon as defined in claim 1 and further characterized by said solution of a partially cured alkyl silicate having dry particulate matter mixed therein, said particulate matter being from the class consisting of silica, talc, mica, kaolin, bentonite, asbestos, fireclay, aluminum oxide, zircon, ferric oxide, tin oxide, titanium oxide, chromium oxide, carbon, copper oxide, copper, aluminum, stainless steel, and zinc in quantities less than required to cause electrolytic action with the metal substrate, said dry particulate matter being in the ratio of one part thereof by volume to between one part to 100 parts by volume of the alkyl silicate solution.

5. A method of treating a corrosible steel substrate having a rusted oxidized layer thereon as defined in claim 4 and further characterized by said dry particulate matter being water insoluble.

6. A method of treating a corrosible steel substrate having a rusted oxidized layer thereon as defined in claim 4 and further characterized by said dry particulate matter being of readily visible coloration.

7. A method of treating a corrosible steel substrate having a rusted oxidized layer thereon as defined in claim 4 and further characterized by said dry particulate matter having a mesh size of approximately $-325$.

8. A method of treating a corrosible steel substrate having a rusted oxidized layer thereon as defined in claim 4 and further characterized by an inorganic water soluble corrosion inhibiting compound capable of producing ions for reaction with the steel substrate mixed with said alkyl silicate solution, said water soluble compounds being from the class consisting of sodium phosphate, calcium phosphate, potassium phosphate, ammonium phosphate and magnesium phosphate, said water soluble compounds being within the range of .01 to 15% by weight of the alkyl silicate solution.

9. A method of treating a corrosible steel substrate having a rusted oxidized layer thereon as defined in claim 1 and further characterized by a dry particulate matter mixed within the alkyl silicate solution, said dry particulate matter being water insoluble, nonreactive with the silicate and with the substrate, and being of a readily visible coloration, said dry particulate matter being from the class consisting of silica, talc, mica, kaolin, bentonite, asbestos, fireclay, aluminum oxide, zircon, ferric oxide, tin oxide, titanium oxide, chromium oxide, carbon, copper oxide, copper, aluminum, stainless steel, and zinc in quantities less than required to cause electrolytic action with the metal substrate, said dry particulate matter being in the ratio of one part thereof by volume to between one part to 100 parts by volume of the alkyl silicate solution.

10. A method of treating a corrosible steel substrate having a rusted oxidized layer thereon as defined in claim 1 and further characterized by an inorganic water soluble corrosion inhibiting compound capable of producing ions for reaction with the steel substrate mixed with said alkyl silicate solution, said water soluble compounds being from the class consisting of sodium phosphate, calcium phosphate, potassium phosphate, ammonium phosphate, and magnesium phosphate, said water soluble compounds being in the range of .01 to 15% by weight of the alkyl silicate solution.

* * * * *